US012723831B2

(12) United States Patent
Murray

(10) Patent No.: US 12,723,831 B2
(45) Date of Patent: Sep. 1, 2026

(54) MEASURING PRESSURE FOR FIREARM ACCESSORIES

(71) Applicant: SilencerCo Weapons Research, LLC, West Valley City, UT (US)

(72) Inventor: Brent Edward Murray, Herriman, UT (US)

(73) Assignee: SilencerCo Weapons Research, LLC, West Valley City, UT (US)

( * ) Notice: Subject to any disclaimer, the term of this patent is extended or adjusted under 35 U.S.C. 154(b) by 0 days.

(21) Appl. No.: 19/205,726

(22) Filed: May 12, 2025

(65) Prior Publication Data

US 2025/0354772 A1 Nov. 20, 2025

Related U.S. Application Data

(60) Provisional application No. 63/647,151, filed on May 14, 2024.

(51) Int. Cl.
*F41A 21/32* (2006.01)
*G01K 1/14* (2021.01)
*G01L 19/00* (2006.01)

(52) U.S. Cl.
CPC .............. *F41A 21/325* (2013.01); *G01K 1/14* (2013.01); *G01L 19/003* (2013.01)

(58) Field of Classification Search
CPC ...... F41A 21/325; F41A 21/32; G01L 19/003; G01K 1/14; G01P 3/665; G01P 3/685
See application file for complete search history.

(56) References Cited

U.S. PATENT DOCUMENTS

| | | | | |
|---|---|---|---|---|
| 2,824,284 A * | 2/1958 | Johnson | G01S 13/88 | 342/104 |
| 4,228,397 A * | 10/1980 | Schmidt | F41A 21/32 | 324/179 |
| 4,283,989 A * | 8/1981 | Toulios | G01S 13/58 | 342/60 |
| 4,457,206 A * | 7/1984 | Toulios | F41G 5/08 | 89/14.05 |
| 6,064,196 A * | 5/2000 | Oberlin | G01P 3/665 | 324/179 |
| 9,212,861 B2 * | 12/2015 | Panak | F41G 3/00 | |
| 9,513,308 B2 * | 12/2016 | Jung | F42C 11/065 | |
| 10,309,750 B2 * | 6/2019 | Olkinuora | F41G 1/38 | |
| 2005/0114084 A1 * | 5/2005 | Johnson | F41A 19/01 | 702/183 |
| 2008/0211710 A1 * | 9/2008 | Frick | F41A 21/32 | 342/104 |
| 2012/0125092 A1 * | 5/2012 | Downing | G01L 5/14 | 73/167 |

(Continued)

*Primary Examiner* — Joshua E Freeman
(74) *Attorney, Agent, or Firm* — Asgaard Patent Services, LLC; F. Wayne Thompson, Jr.

(57) ABSTRACT

A measurement adapter may include a body, a first attachment interface configured to attach the measurement adapter to a barrel of a firearm, and a second attachment interface configured to attach the measurement adapter to a firearm accessory. A channel may extend between the first attachment interface and the second attachment interface through the body. The measurement adapter may also include a third attachment interface configured to attach the measurement adapter to a sensing device and to provide a sensor of the sensing device access to the channel.

20 Claims, 8 Drawing Sheets

(56) References Cited

U.S. PATENT DOCUMENTS

| | | | | |
|---|---|---|---|---|
| 2015/0308777 | A1* | 10/2015 | Panak | F41A 21/38 89/14.3 |
| 2020/0371128 | A1* | 11/2020 | Williams | G01P 3/665 |
| 2024/0142191 | A1* | 5/2024 | Fredrickson | F41A 21/325 |
| 2025/0102388 | A1* | 3/2025 | Xu | G01L 19/0038 |

* cited by examiner

100

200

700

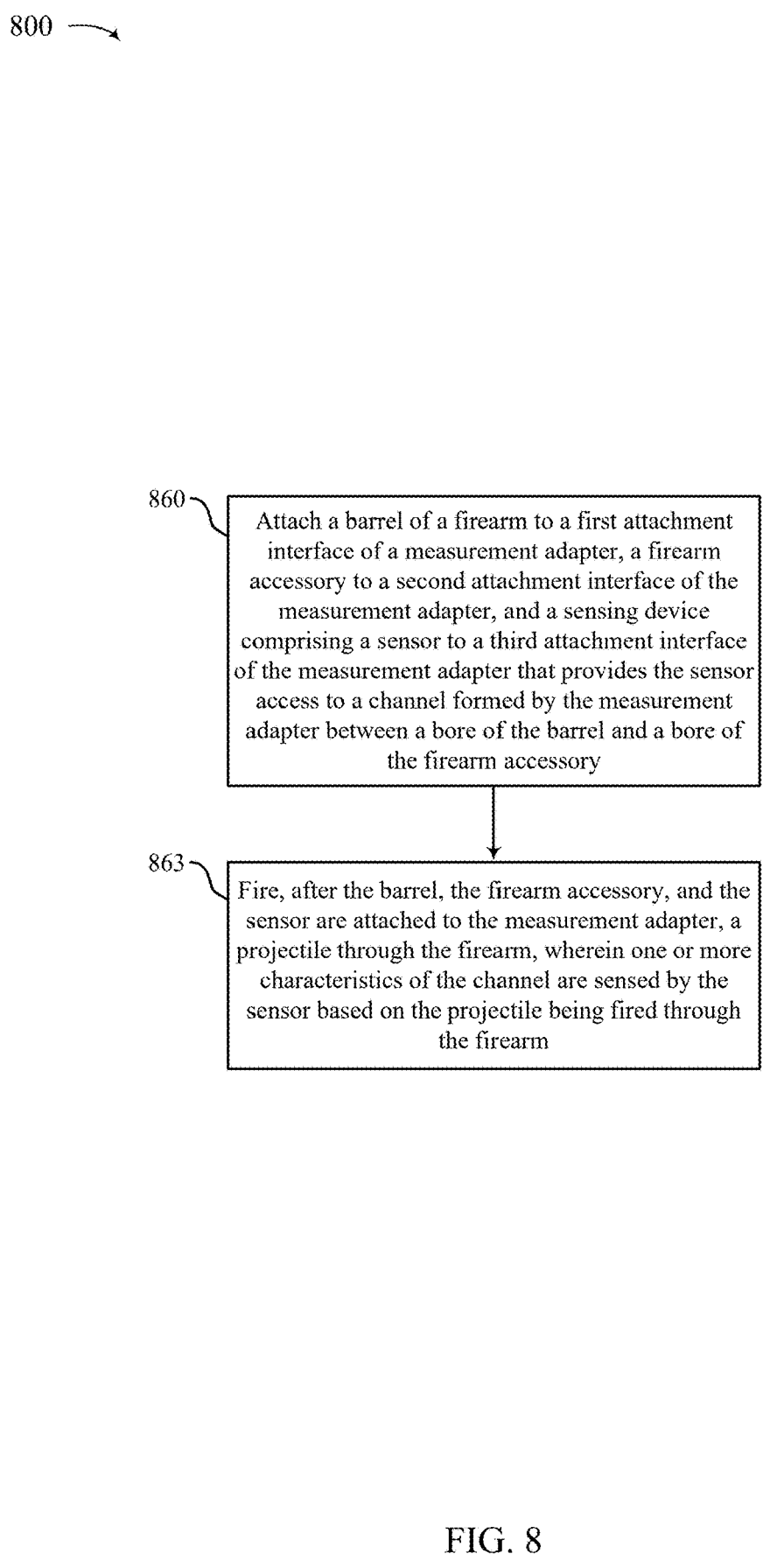

800

860 Attach a barrel of a firearm to a first attachment interface of a measurement adapter, a firearm accessory to a second attachment interface of the measurement adapter, and a sensing device comprising a sensor to a third attachment interface of the measurement adapter that provides the sensor access to a channel formed by the measurement adapter between a bore of the barrel and a bore of the firearm accessory 863 Fire, after the barrel, the firearm accessory, and the sensor are attached to the measurement adapter, a projectile through the firearm, wherein one or more characteristics of the channel are sensed by the sensor based on the projectile being fired through the firearm

FIG. 8

MEASURING PRESSURE FOR FIREARM ACCESSORIES

CROSS REFERENCE

The present application for Patent claims the benefit of U.S. Provisional Patent Application No. 63/647,151 by Murray, entitled "MEASURING PRESSURE FOR FIREARM ACCESSORIES," filed May 14, 2024, assigned to the assignee hereof, and expressly incorporated by reference herein.

TECHNICAL FIELD

The present disclosure relates to firearms, including measuring pressure for firearm accessories.

BACKGROUND

Firearm accessories (e.g., muzzle brakes, compensators, noise suppressors, flash suppressors, etc.) may be attached to a firearm (e.g., a muzzle end of a firearm). In some examples, characteristics for a firearm accessory may be measured based on measuring characteristics of a firearm attached to the firearm accessory. For example, pressure measurement for a firearm accessory may be measured based on measuring pressure via a hole drilled in a barrel of a firearm attached to the firearm accessory. Such techniques may require destruction of a barrel of a firearm to obtain measurements of a firearm accessory.

BRIEF DESCRIPTION OF THE DRAWINGS

FIG. 8 shows an example of a diagram for measuring pressure for firearm accessories in accordance with examples as disclosed herein.

DETAILED DESCRIPTION

Characteristics of firearm accessories may be measured based on measuring characteristics of one or more respective barrels attached to the firearm accessories. In some examples, measuring characteristics of a barrel may include drilling a hole in the barrel to provide a sensor access to the barrel, which may result in the destruction of the barrel. In some examples, measuring characteristics of the barrel may alternatively include measuring slight movements of an exterior of the barrel, which may be a more expensive and, in some examples, a less accurate way of measuring characteristics of the barrel. Also, the measurement obtainable with techniques that use an exterior of the barrel to measure characteristics may be limited relative to techniques that have access to an interior of the barrel. Moreover, a user or manufacturer of a firearm accessory may be more concerned with characteristics of the firearm accessory (e.g., which may be more appropriately measured at the muzzle of the firearm) rather than characteristics of the barrel itself.

Thus, for measuring characteristics of a firearm accessory, implementations that support measuring the characteristics of the firearm accessory without drilling or otherwise directly using the barrel of the firearm may be desired from both a practical and accuracy standpoint.

To support measuring the characteristics of a firearm accessory without drilling or otherwise directly using the barrel of the firearm, a device (which may be referred to as a measurement adapter) may be positioned in between the barrel of a firearm and the firearm accessory and used to measure characteristics of the measurement adapter when and/or after a projectile is fired through the barrel, where the characteristics of the measurement adapter may be correlated with characteristics of the firearm accessory.

Figure 1:
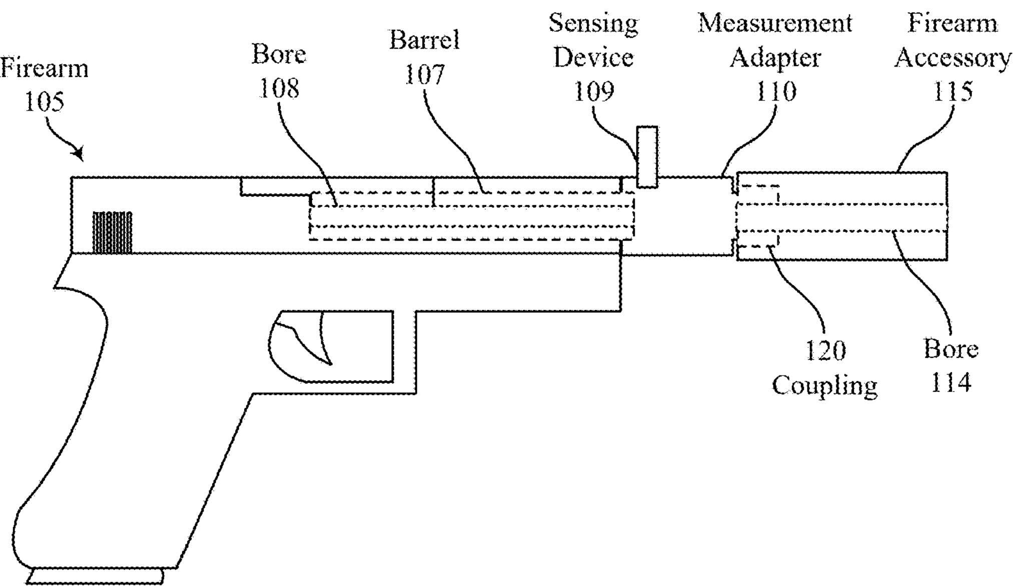
FIG. 1 shows an example of a system that supports measuring pressure for firearm accessories in accordance with examples as disclosed herein.

FIG. 1 shows an example of a system that supports measuring pressure for firearm accessories in accordance with examples as disclosed herein.

The system 100 includes the firearm 105, the measurement adapter 110, and the firearm accessory 115. Though depicted as a pistol, the firearm 105 may be a different type of firearm, such as a rifle. The firearm 105 may include the barrel 107. In some examples, the barrel 107 is fixed and does not move when a bullet is discharged from the firearm 105. In some examples, the barrel 107 is not fixed and moves when a bullet is discharged from the firearm 105 (e.g., the barrel 107 may move backwards, tilt upwards, or both). A bore 108 may extend through the barrel 107, where a projectile fired from the firearm 105 may travel through the bore 108.

A user of the firearm 105 may wish to connect different firearm accessories (e.g., the firearm accessory 115) to the barrel 107 throughout the operating life of the firearm 105. The firearm accessory 115 may be a muzzle brake, a compensator, a flash suppressor, a noise suppressor (which may also be referred to as a silencer), or the like. A bore 114 may extend through the firearm accessory 115, where a projectile fired from the firearm 105 and through the firearm accessory 115 may travel through the bore 114. A diameter of the bore 114 may be greater than or equal to a diameter of the bore 108.

The firearm accessory 115 may include a coupling 120. In some examples, the coupling 120 may interface directly with the barrel of the firearm 105—e.g., in the absence of the measurement adapter 110. For example, inner diameter threads on the coupling 120 may couple with outer diameter threads on the barrel 107 of the firearm 105. In some examples, the coupling 120 is integrally formed with the firearm accessory 115 (e.g., as part of an elongate body that forms a muzzle brake). In some examples, the coupling 120 is formed in a component of the firearm accessory 115 (e.g., in a piston of a Nielsen device). In some examples, the coupling 120 is a separate component that is coupled with the firearm accessory 115—e.g., the coupling 120 may include threads that mate with complementary threads of the firearm accessory 115, a component of the firearm accessory 115, or both. In some examples, the coupling 120 may be referred to as an adapter (e.g., a second adapter).

In a first scenario, a user or manufacturer of the firearm 105 may wish to understand the pressures that form in the barrel 107 when and/or after a projectile is fired through the barrel 107. For instance, the user or manufacturer may wish to know an "uncorking pressure" within the barrel 107 when a projectile leaves the barrel 107. In some instances, the user or manufacturer may wish to know the highest pressure experienced at one or more locations within the barrel 107 when and/or after a projectile is fired through the barrel 107—e.g., for safety reasons related to ensuring the integrity of the barrel, to understand how the pressure will affect other operations of the firearm 105 (e.g., cycling), etc.

One way to obtain these measurements is to drill a hole in the barrel 107 and insert a pressure sensor into the hole such that the pressure sensor can directly measure the pressure within the barrel 107 when and/or after a projectile is fired through the barrel 107. However, this testing technique destroys the barrel 107 for future use. In such cases, if the user or manufacturer wishes to test barrels of different makes, models, or calibers, the user or manufacturer may be required to drill holes in each of the respective barrels. Accordingly, measuring the characteristics of firearm barrels in this way may come at an increased testing cost, an increased machining burden (e.g., requiring more barrels to be produced, drilled, etc.), and the like.

In some examples, the hole drilled in the barrel 107 is threaded to mate with the threads of a specific pressure sensor or specific set of pressure sensors. In such cases, the barrel 107 may, in some examples, be limited to use with that specific pressure sensor or set of pressure sensors (e.g., that share threading dimensions). Accordingly, if the user or manufacturer wishes to test barrels using different sensors (or sets of sensors), the user or manufacturer may be required to drill holes in multiple barrels and to thread respective holes in respective barrels of the multiple barrels with respective threading dimensions.

Another way to obtain these measurements is to place a measurement device around the barrel 107 to indirectly measure the pressure within the barrel 107—e.g., by associating changes in the diameter of the barrel to pressure changes. Though avoiding the destruction of the barrel 107, this testing technique may require more expensive equipment (e.g., to measure the small dimensional changes in the barrel 107), may require more expensive software, may suffer from inaccuracies, may limit the user or manufacturer to fewer sensing options, or any combination thereof.

In a second scenario, a user or manufacturer of the firearm 105 or the firearm accessory 115 may wish to understand how attaching a firearm accessory (such as the firearm accessory 115) to the firearm 105 affects the operation of the firearm 105. For example, the user or manufacturer may similarly wish to know how attaching the firearm accessory 115 to the firearm 105 affects the pressure in the barrel 107 when and/or after a projectile is fired through the barrel 107. Accordingly, the user or manufacturer may similarly measure the barrel pressure using one or more of the testing techniques described above.

In a third scenario, a user or manufacturer of the firearm accessory 115 may wish to understand how attaching the firearm accessory 115 to a firearm (such as the firearm 105) affects the operation of the firearm accessory 115. For example, the user or manufacturer may wish to understand the pressures that form in the firearm accessory 115 when and/or after a projectile enters the firearm accessory 115. For instance, the user or manufacturer may wish to know the highest pressure experienced at an end of the firearm accessory 115 that mates with the barrel 107 when and/or after a projectile is fired through the barrel 107. Additionally, the user or manufacturer may wish to know subsequent pressures (e.g., back pressures) that form within the firearm accessory 115 when and/or after the projectile is fired through the firearm accessory 115. In some examples, the user or manufacturer may measure (e.g., indirectly) pressures in the firearm accessory 115 by measuring pressures in the barrel 107 using one or more of the testing techniques described above.

But, as described above, using other testing techniques for testing the pressures within the firearm accessory may come at the cost of increased testing expense, an increased machining burden, and the like. Also, if the user or manufacturer wishes to test the use of a firearm accessory with different barrels of different makes, models, or calibers (e.g., for firearm accessories that support multiple calibers), the user or manufacturer may be required to drill holes in each of the respective barrels, potentially resulting in the destruction of many barrels.

Moreover, unlike in the first two scenarios, in the third scenario, the user or manufacturer of the firearm accessory 115 may be more concerned with characteristics of (e.g., the pressures that form within, debris that is discharged or builds up, etc.) the firearm accessory 115 rather than characteristics of the barrel 107 itself. For example, to understand an effect of the firearm accessory 115 on the shooting performance (e.g., an effect on blowback, etc.) of the firearm 105 itself, the user or manufacturer of the firearm accessory 115 may be concerned with the amount of back pressure created by the firearm accessory 115 at the muzzle of the barrel 107 rather than the amount of pressure in the barrel 107.

Thus, for measuring characteristics of a firearm accessory, implementations (e.g., systems, techniques, methods, operations, apparatuses, mechanisms, interfaces, devices, instruments, components, configurations) that support measuring the characteristics of the firearm accessory without drilling or otherwise directly using the barrel of the firearm may be desired from both a practical and accuracy standpoint.

To support measuring the characteristics of a firearm accessory without drilling or otherwise directly using the barrel of the firearm, a device (which may be referred to as a measurement adapter) may be positioned in between the barrel of a firearm and the firearm accessory and used to measure characteristics of the measurement adapter (e.g., the measurement adapter 110) when and/or after a projectile is fired through the barrel, where the characteristics of the measurement adapter may be correlated with characteristics of the firearm accessory.

The measurement adapter 110 may be configured to provide an interface for attaching firearm accessories (e.g., the firearm accessory 115) to, and detaching firearm accessories from, the firearm 105. The measurement adapter 110 may include an interface (e.g., threads, such as inner diameter threads) for attaching to the firearm 105—e.g., by mating with complementary threads on the barrel 107 of the firearm 105. The measurement adapter 110 may also include an interface (e.g., threads, such as outer diameter threads) for attaching to the firearm accessory 115 (e.g., via the coupling 120)—e.g., by mating with complementary threads on the firearm accessory 115. The measurement adapter 110 may further be configured to enable characteristics of firearm accessories (e.g., the firearm accessory 115) to be measured. For example, the measurement adapter 110 may include an attachment interface for receiving a sensing device having a sensor (e.g., the sensing device 109) and providing the sensor of the sensing device access to a channel between the barrel 107 and the firearm accessory 115. In such cases, the sensing device may sense characteristics of the firearm accessory 115 via the channel. In some examples, the access to the channel is provided by way of a hole that extends through the measurement adapter 110 and into a side of the channel. In some examples, the access to the channel is provided by way of a hole that extends into the measurement adapter 110 and ends next to the channel.

In some examples, the measurement adapter 110 includes a body. The measurement adapter 110 may also include a first attachment interface coupled with (e.g., connected to, extending from, etc.) the body of the measurement adapter 110, where the first attachment interface may be used to attach the measurement adapter 110 to the barrel 107 of the firearm. The measurement adapter 110 may also include a second attachment interface coupled with (e.g., connected to, extending from, etc.) the body of the measurement adapter 110, where the second attachment interface may be used to attach the measurement adapter 110 to the firearm accessory 115 (e.g., by connecting the measurement adapter 110 to the coupling 120). In some examples, the first attachment interface and the second attachment interface include threads that couple with (e.g., mate with) complementary threads of the barrel 107 and the firearm accessory 115.

A channel may extend between the first attachment interface and the second attachment interface and through the body of the measurement adapter 110. The channel may be configured to couple (e.g., by providing a passage between) a bore of the barrel 107 with a bore of the firearm accessory 115. In some examples, the bore of the barrel 107 is a different size (e.g., smaller) than the bore of the firearm accessory 115. In some examples, the channel extends from an end of the barrel 107 through an end of the second attachment interface. A hole may extend into (e.g., in or through) the body (e.g., a top of the body) of the measurement adapter 110 to (e.g., toward, next to, into) a side of the channel. The hole may be configured to receive equipment (e.g., the sensing device 109) for sensing characteristics (e.g., pressure characteristics, such as an initial pressure spike, a back pressure spike, a pressure holding duration; temperature characteristics, such as instantaneous temperature, temperature over time, temperature for specific cycles; debris characteristics, such as debris blowback, debris buildup) of the channel, where the characteristics of the channel may be (e.g., closely) correlated with characteristics of the firearm accessory 115.

By using an in-line measurement adapter as a point for measuring characteristics of firearm accessories attached to a firearm, a cost, machining and testing burden, and duration associated with firearm accessory testing may be significantly reduced. Particularly, a cost, machining and testing burden, and duration associated with firearm accessory testing that uses different manufacturer barrels, different models of one or more manufacturer barrels, different caliber barrels, different sensors, etc., may be significantly reduced. Additionally, by using an in-line measurement adapter (rather than a point within a barrel) as a point for measuring characteristics of firearm accessories attached to a firearm, more accurate measurements of the effect of a firearm accessory at the muzzle of a barrel may be obtained.

Figure 2:
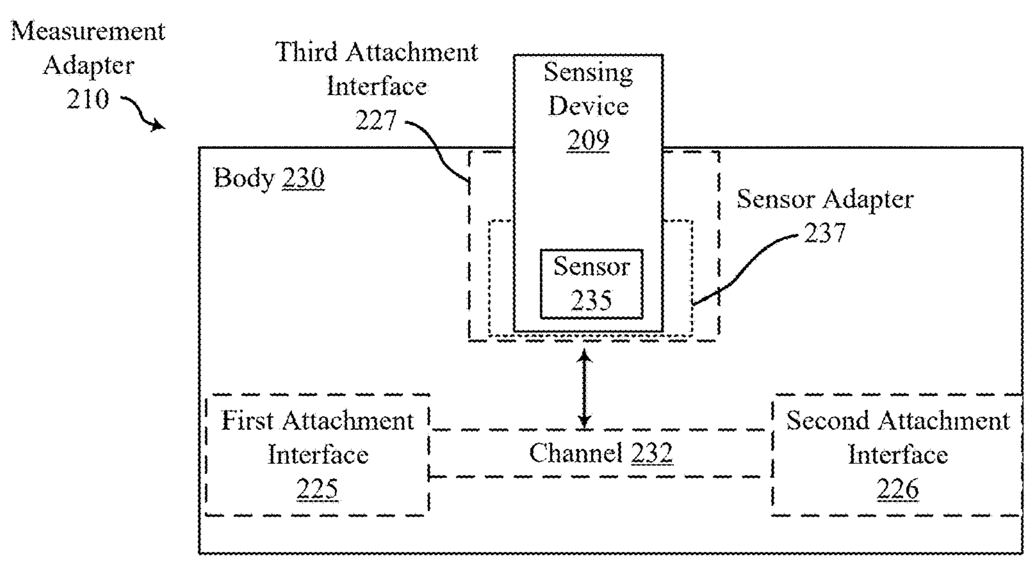
FIG. 2 shows an example of a subsystem that supports measuring pressure for firearm accessories in accordance with examples as disclosed herein.

FIG. 2 shows an example of a subsystem that supports measuring pressure for firearm accessories in accordance with examples as disclosed herein.

The subsystem 200 may include the measurement adapter 210, which may be an example of a measurement adapter described herein (e.g., the measurement adapter 110). The measurement adapter 210 may include the first attachment interface 225, the second attachment interface 226, the third attachment interface 227, the body 230, and the channel 232.

The first attachment interface 225 may be configured to attach the measurement adapter 210 to a firearm accessory (e.g., the firearm accessory 115 of FIG. 1). The second attachment interface 226 may be configured to attach the measurement adapter 210 to a firearm (e.g., the barrel 107 of the firearm 105 of FIG. 1). The third attachment interface 227 may be configured to attach a sensing device (e.g., the sensing device 109 of FIG. 1, the sensing device 209) to the measurement adapter 210. The channel 232 may be configured to provide a passage through the measurement adapter—e.g., from a first end of the measurement adapter 210 to a second end of the measurement adapter 210. In some examples, a portion of the channel 232 extends into the first attachment interface 225, the second attachment interface 226, or both.

The sensing device 209 may be an example of a sensing device described herein (e.g., the sensing device 109 of FIG. 1). The sensing device 209 may be configured to house the sensor 235 and to relay (e.g., electronically or mechanically) measurements sensed by the sensor 235—e.g., to a computer. The sensor 235 may be a pressure sensor, a temperature sensor, a debris sensor, or any combination thereof. In some examples, a sensing device 209 may be connected to the measurement adapter 210. In some examples, the sensing device 209 is directly coupled to the measurement adapter 210—e.g., by mating threads of the sensing device 209 with threads of the third attachment interface, by plugging a quick connect plug of the sensing device 209 into a quick connect coupling of the third attachment interface 227.

In some examples, the sensing device 209 is indirectly coupled to the measurement adapter via the sensing adapter 237. The sensing adapter 237 may include a threaded hole configured to mate with the threads of the sensing device 209 and a threaded shaft configured to mate with the threads of the third attachment interface 227. Thus, the sensing adapter 237 may be used to attach the sensing device 209 to the third attachment interface 227 when the threads of the sensing device 209 are incompatible with the threads of the third attachment interface 227.

In some examples, the sensing adapter 237 may include a threaded hole configured to mate with a threaded shaft of the sensing device 209 and a quick connect coupling configured to mate with a quick connect plug of the third attachment interface 227. In some examples, the sensing adapter 237 may include a quick connect coupling configured to mate with a quick connect plug of the sensing device 209 and a threaded shaft to mate with a threaded hole of the third attachment interface 227. Thus, the sensing adapter 237 may be used to attach the sensing device 209 to the third attachment interface 227 when the sensing device 209 has a different attachment type than the third attachment interface 227, while also allowing for sensing devices to be easily and quickly swapped at the measurement adapter 210.

In some examples, the sensing adapter 237 is configured to set a depth of the sensor 235 within the third attachment interface 227—e.g., to improve a sensing result, to ensure the sensor 235 does not obstruct a projectile traveling through the measurement adapter 210, etc. In some cases, different sensing adapters may be used to set different depths for the sensor 235. For example, different thread patterns, lengths or both for the sensing adapter 237 may be configured to stop the downward movement of the sensing adapter 237 at different levels within the third attachment interface 227. In other examples, a set screw in the sensing adapter 237 may enable a depth of the sensor 235 to be varied.

Figure 3A:
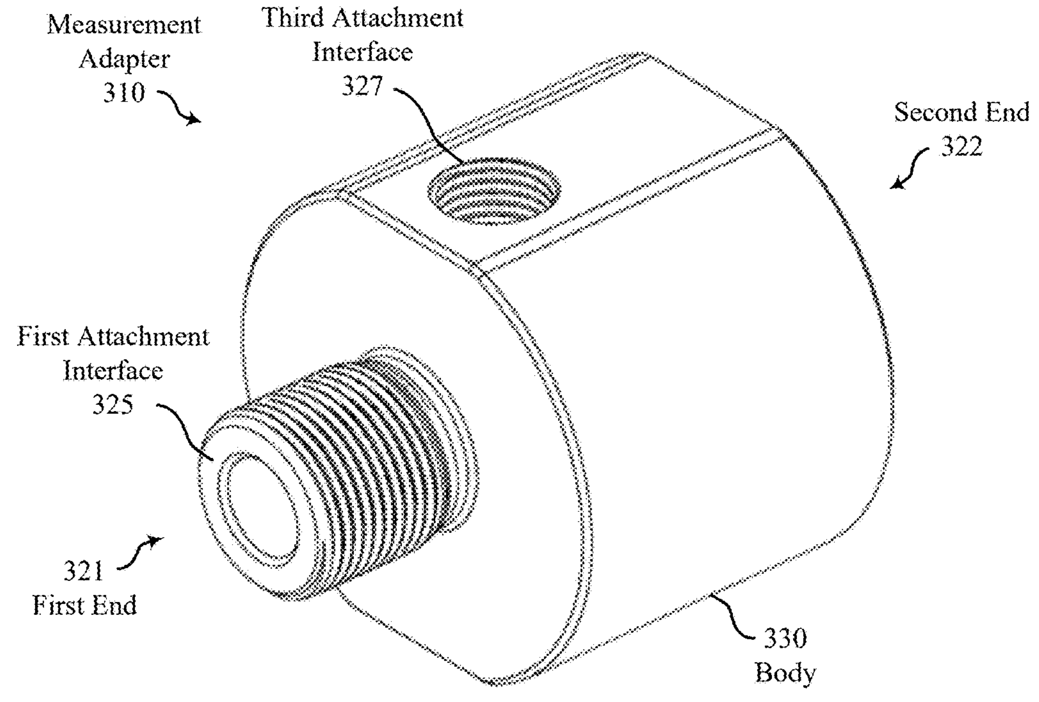
FIGS. 3A and 3B show isometric views of an example measurement adapter that supports measuring pressure for firearm accessories in accordance with examples as disclosed herein.
Figure 3B:
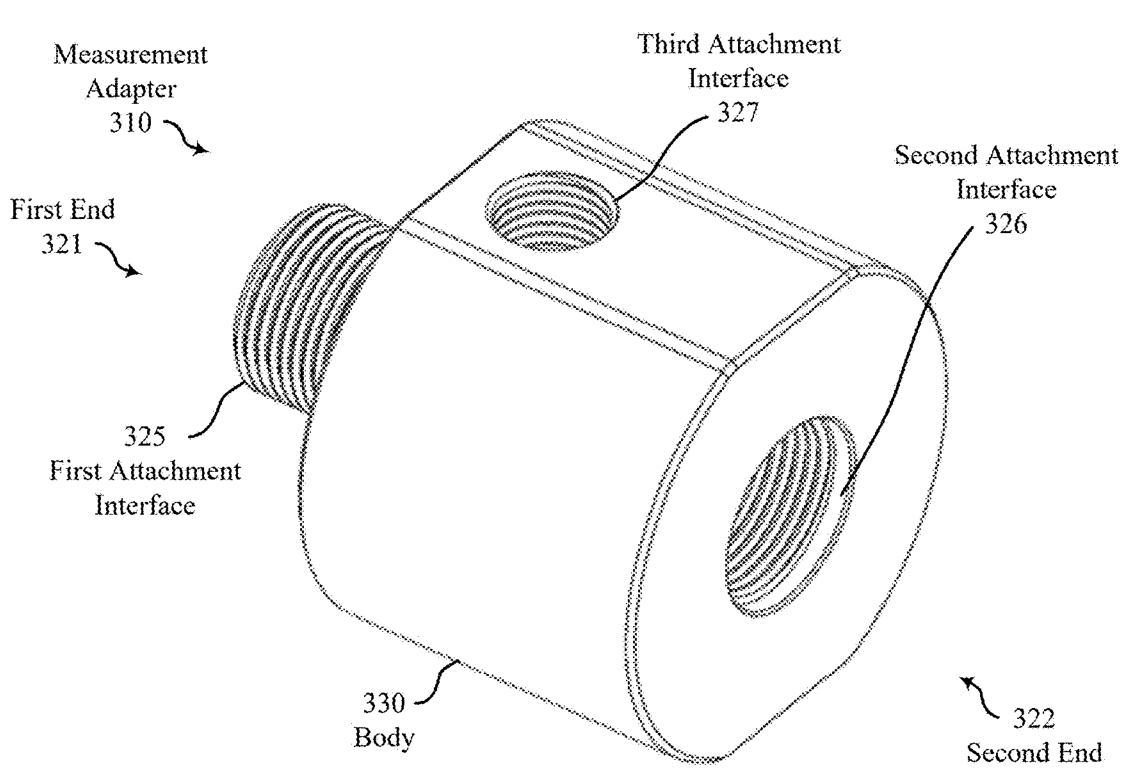

FIGS. 3A and 3B show isometric views of an example measurement adapter that supports measuring pressure for firearm accessories in accordance with examples as disclosed herein.

The first isometric view 300-*a* depicts the measurement adapter 310 when observed from a first direction. The second isometric view 300-*b* depicts the measurement adapter 310 when observed from a second direction. The measurement adapter 310 may be an example of a measurement adapter described herein (e.g., the measurement adapter 110 of FIG. 1, the measurement adapter 210 of FIG. 2).

As depicted in FIGS. 3A and 3B, the measurement adapter 310 may include the first attachment interface 325 (which may be an example of a first attachment interface described herein, such as the first attachment interface 225 of FIG. 2) at the first end 321 of the measurement adapter 310, the second attachment interface 326 (which may be an example of a second attachment interface described herein, such as the second attachment interface 226 of FIG. 2) at the second end 322 of the measurement adapter 310, the body 330 (which may be an example of a body described herein, such as the body 230 of FIG. 2), and the third attachment interface 327 (which may be an example of a third attachment interface described herein, such as the third attachment interface 227 of FIG. 2) in the body 330. The second attachment interface 326 may also be in the body 330. In some examples, the measurement adapter may be made out of metal (e.g., aluminum), plastic (e.g., polycarbonate), or a combination thereof.

The first attachment interface 325 may be configured to attach the measurement adapter 310 to a firearm accessory (e.g., the firearm accessory 115 of FIG. 1). In some examples, the first attachment interface 325 is a threaded shaft that mates with complementary threads of a threaded hole of the firearm accessory. In some examples, the threaded shaft has a UNEF thread dimension (UNEF No. 12, UNEF ¼, UNEF 5⁄16 . . . UNEF 1 11⁄16), where the thread dimension of the threaded shaft may be based on the dimensions of a barrel of a firearm. In some examples, the thread dimensions of the threaded shaft may be selected to be compatible with standardized thread dimensions used by firearm accessory manufacturers. For example, the threaded shaft may have a UNEF ⅝ thread dimension such that the major diameter of the threading is 0.625 inches, the thread per inch is 24, the pitch diameter is 0.5979, and the minor diameter male thread is 0.5754.

In some examples, the first attachment interface 325 is a quick-connect plug that mates with a quick connect coupling of the firearm accessory (e.g., a quick connect coupling connected to or integrated with the firearm accessory or a component of the firearm accessory, such as a Nielsen device). More generally, the first attachment interface 325 may be implemented using any fastener suitable for attaching to a firearm accessory—e.g., while maintaining pressure loss below a threshold and fastening strength to the firearm accessory above a threshold.

In some examples, the first attachment interface 325 is integrated with the body 330—e.g., as a single piece. In some examples, the first attachment interface 325 is connected to the body 330—e.g., as a separate piece.

The second attachment interface 326 may be configured to attach the measurement adapter 310 to a firearm (e.g., the barrel 107 of the firearm 105 of FIG. 1). In some examples, the second attachment interface 326 is a threaded hole that mates with complementary threads of a threaded shaft of the firearm (e.g., a barrel of the firearm). In some examples, the threaded hole has a UNEF thread dimension (UNEF No. 12, UNEF ¼, UNEF 5⁄16 . . . UNEF 1 11⁄16), where the thread dimension of the threaded hole may be based on the dimensions of a barrel of a firearm. In some examples, the thread dimensions of the threaded hole may be selected to be compatible with standardized thread dimensions used by barrel and/or firearm manufacturers. For example, the threaded hole may have a UNEF ⅝ thread dimension such that the major diameter of the threading is 0.625 inches, the thread per inch is 24, the pitch diameter is 0.5979, and the minor diameter female thread is 0.5799.

In some examples, the second attachment interface 326 is a quick-connect coupling that mates with a quick connect plug of the firearm (e.g., a quick connect plug connected to or integrated with the barrel of the firearm). More generally, the second attachment interface 326 may be implemented using any fastener suitable for attaching to a firearm accessory—e.g., while maintaining pressure loss below a threshold and fastening strength to the firearm above a threshold.

The third attachment interface 327 may be configured to attach a sensing device (e.g., a pressure sensor, a temperature sensor, a debris sensor, or any combination thereof) to the measurement adapter 310. In some examples, the third attachment interface 327 is a threaded hole that mates with complementary threads of a threaded shaft of the sensing device. In some examples, the third attachment interface 327 is a threaded hole that mates with complementary threads of a threaded shaft of a sensing adapter, where the sensing adapter can be coupled with a sensing device. In some examples, the threaded hole has a UNEF thread dimension (UNEF No. 12, UNEF ¼, UNEF 5⁄16 . . . UNEF 1 11⁄16), where the thread dimension of the threaded hole may be based on the dimensions of a sensing device. In some examples, the thread dimensions of the threaded hole may be selected to be compatible with standardized thread dimensions used by sensing devices associated with measuring firearm and/or firearm accessory characteristics. For example, the threaded hole may have a UNEF 5⁄16 thread dimension such that the major diameter of the threading is 0.3125 inches, the thread per inch is 32, the pitch diameter is 0.2922, and the minor diameter female thread is 0.2787.

In some examples, the third attachment interface 327 is a quick-connect coupling that mates with a quick connect plug of the sensing device or of the sensing adapter. More generally, the third attachment interface 327 may be implemented using any fastener suitable for attaching to a sensing device—e.g., while maintaining pressure loss below a threshold and fastening strength to the sensing device above a threshold.

In some examples, the measurement adapter 310 is modular such that a first piece of the measurement adapter 310 includes the first attachment interface 325, a second piece of the measurement adapter 310 includes the second attachment interface 326, and a third piece of the measurement adapter includes the third attachment interface 327. In such cases, different pieces may be configured with different dimensions, thread dimensions, and the like, and may be combined with one another to be compatible with different firearm, firearm accessory, and sensing device combinations.

Figure 4A:
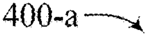
FIGS. 4A and 4B show cross-sectional views of an example measurement adapter that supports measuring pressure for firearm accessories in accordance with examples as disclosed herein.
Figure 4A:
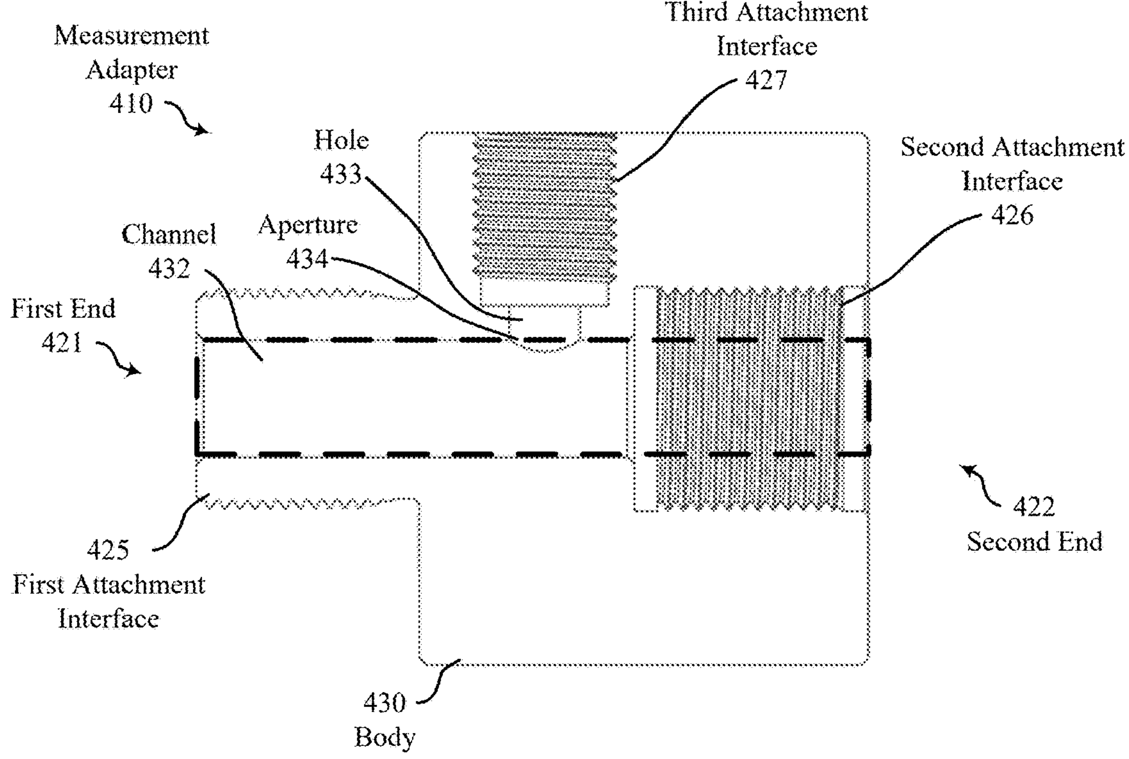
Figure 4B:
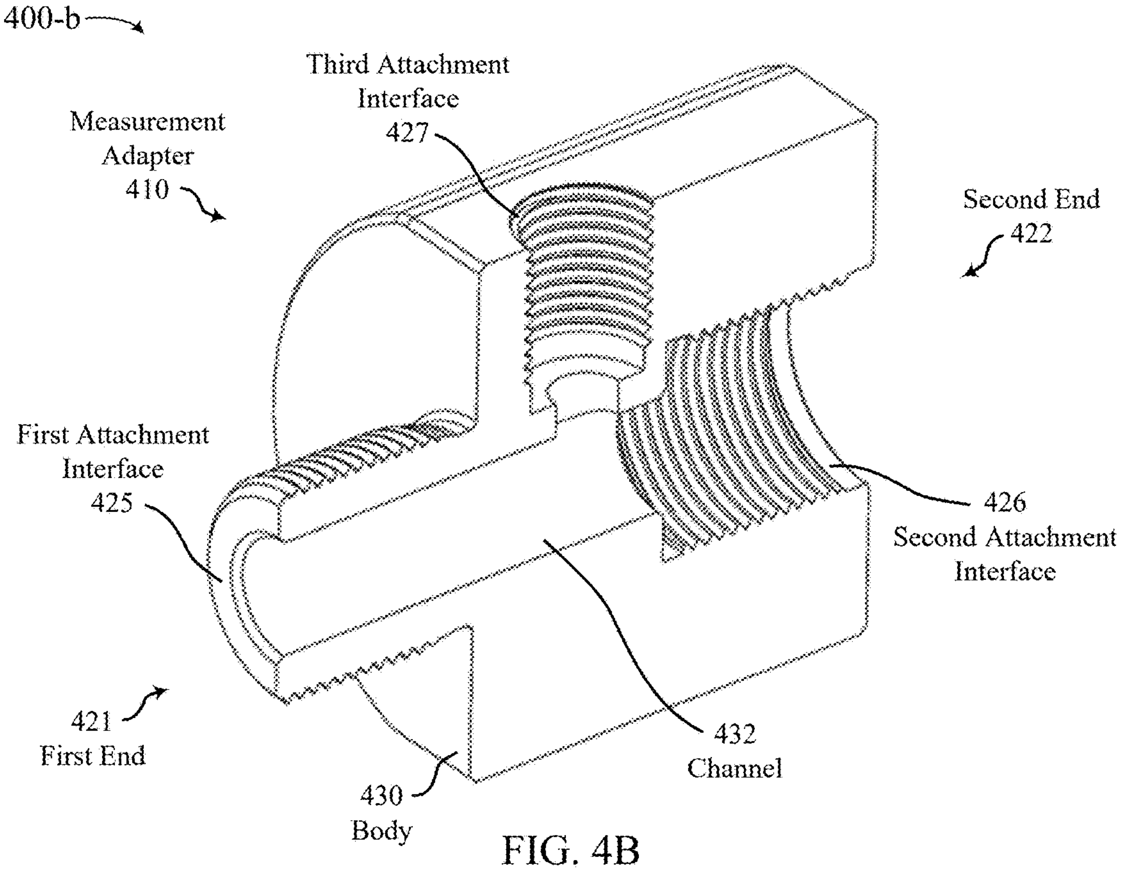

FIGS. 4A and 4B show cross-sectional views of an example measurement adapter that supports measuring pressure for firearm accessories in accordance with examples as disclosed herein.

The cross-sectional view 400-*a* depicts a cross-section of the measurement adapter 410 when observed from a first direction. The isometric cross-sectional view 400-*b* depicts the cross-section of the measurement adapter 410 when observed from a second direction. The measurement adapter 410 may be an example of a measurement adapter described herein (e.g., the measurement adapter 110 of FIG. 1, the measurement adapter 310 of FIGS. 3A and 3B).

As depicted in FIGS. 4A and 4B, the measurement adapter 410 may include the first attachment interface 425 (which may be an example of a first attachment interface described herein, such as the first attachment interface 225 of FIG. 2 or the first attachment interface 325 of FIGS. 3A and 3B) at the first end 421 of the measurement adapter 410, the second attachment interface 426 (which may be an example of a second attachment interface described herein, such as the second attachment interface 226 of FIG. 2 or the second attachment interface 326 of FIGS. 3A and 3B) at the second end 422 of the measurement adapter 410, the body 430 (which may be an example of a body described herein, such as the body 230 of FIG. 2 or the body 330 of FIGS. 3A and 3B), and the third attachment interface 427 (which may be an example of a third attachment interface described herein, such as the third attachment interface 227 of FIG. 2 or the third attachment interface 327 of FIGS. 3A and 3B) in the body 430. The second attachment interface 426 may also be in the body 430.

The measurement adapter 410 may include the channel 432 (which may be an example of a channel described herein, such as the channel 232 of FIG. 2.) The channel 432 may provide a passage between the first end 421 of the measurement adapter 410 and the second end 422 of the measurement adapter 410. In some examples, the channel 432 includes rifling. In some examples, the channel 432 extends contiguously through the first attachment interface 425, through the body 430, and opens into the hole in the second attachment interface 426. In some examples (as depicted), the channel 432 is considered as extending through the first attachment interface 425, the body 430, and the second attachment interface 426, though the channel 432 may not be bounded by the walls of the hole in the second attachment interface 426—e.g., the channel 432 may be bounded by an extension of the walls forming the channel 432 in the body 430.

In some examples, the channel 432, when measured from the end of the first attachment interface 425 to a beginning of the second attachment interface 426, measures between 25 and 35 mm. In some examples, the channel 432, when measured from the end of the first attachment interface 425 to an end of the second attachment interface 426 (e.g., from the first end 421 to the second end 422), measures between 55 and 40 mm. In some examples, a diameter of the channel is between 6 mm and 15 mm.

The third attachment interface 427 may include a hole 433 that is configured to expose the channel (e.g., by extending through a side of the channel 432) such that a sensor of a sensing device may be positioned partially within or adjacent to the channel. In some examples, the hole 433 of the third attachment interface 427 may not expose the channel but may instead terminate within a threshold distance of the channel such that a sensor of the sensing device may be positioned adjacent to the channel while maintaining isolation from the fluid (e.g., gas and debris) in the channel. In such cases, the sensor may measure pressure in the channel based on movement of the sidewall of the channel, temperature in the channel based on a temperature of the sidewall of the channel, or both.

In some examples, the third attachment interface 427 may include a threaded hole that terminates prior to the side of the channel 432 and a second (e.g., nonthreaded) hole 433 at the bottom of the threaded hole that extends into the side of the channel 432 (e.g., forming the aperture 434).

In some examples, the aperture 434 and/or the hole 433 in the third attachment interface 427 may have a diameter between 3 and 7 mm. In some examples, the diameter of the aperture 434 and/or the hole 433 in the third attachment interface 427 is selected based on a width of the channel 432 e.g., the relative dimensions are selected to enable the sensor to take an accurate reading. In some examples, the relative dimensions are determined based on a specification sheet for the sensor. In some examples, the diameter of the aperture 434 and/or the hole 433 in the third attachment interface 427 is selected based on a width of the sensor.

In some examples, a user or manufacturer may have multiple iterations of a measurement adapter, where different iterations may be compatible with different combinations of barrel threading, barrel caliber, firearm accessory threading, sensing device threading, sensing device diameters, sensor diameters, sensor specification, or any combination thereof. In such cases, the user or manufacturer may select the measurement adapter suited to measuring characteristics of a particular combination that has been selected by the user or manufacturer for testing.

Figure 5:
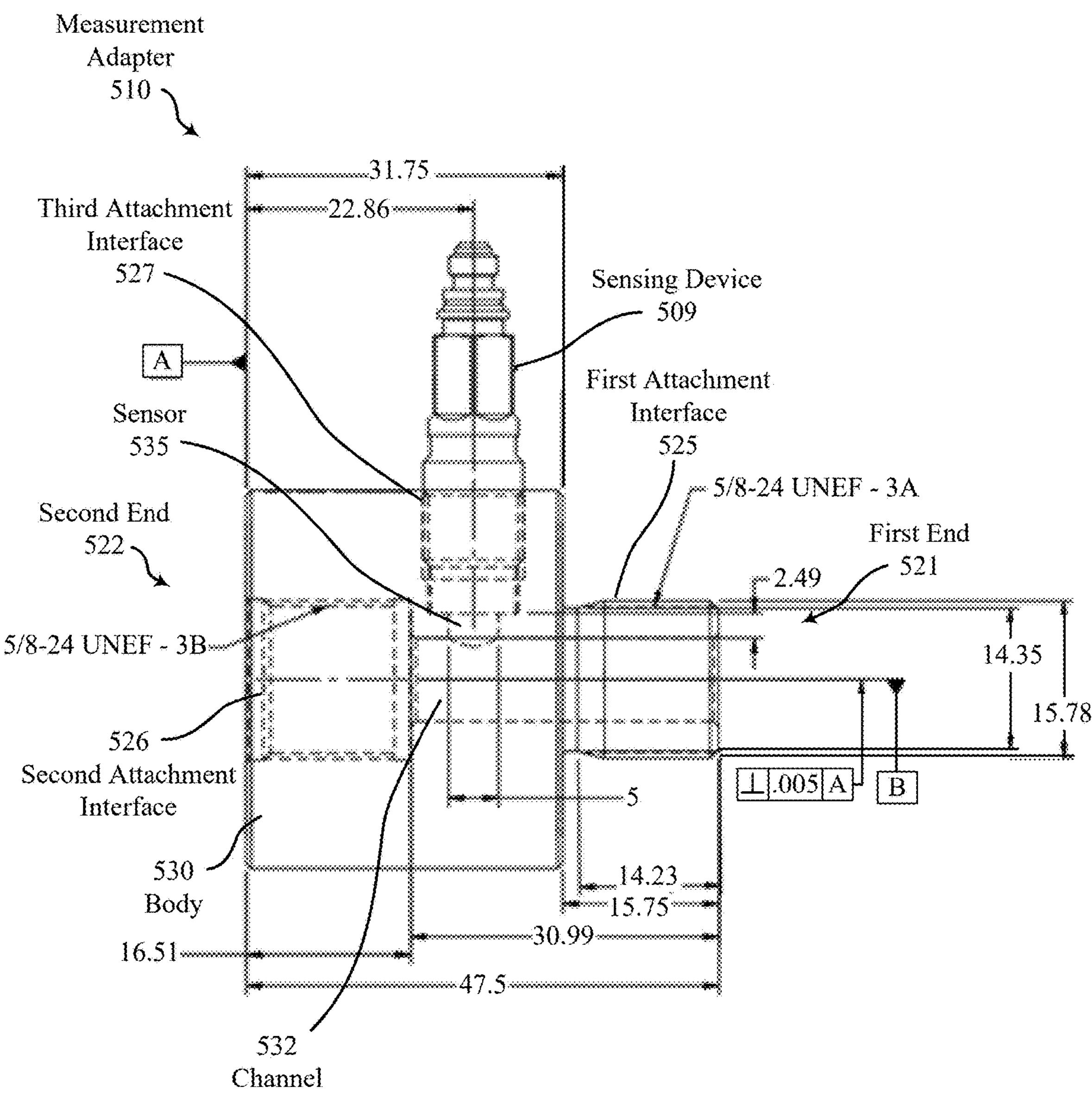
FIG. 5 shows an example of a measurement adapter that supports measuring pressure for firearm accessories in accordance with examples as disclosed herein.

FIG. 5 shows an example of a measurement adapter that supports measuring pressure for firearm accessories in accordance with examples as disclosed herein.

The measurement adapter 510 may include the first attachment interface 525 at the first end 521 of the measurement adapter 510, the second attachment interface 526 at the second end 522 of the measurement adapter 510, the body 530, and the third attachment interface 527 in the body 530. The second attachment interface 526 may also be in the body 530. The measurement adapter 510 may also include the channel 532. The measurement adapter 510 may be an example of a measurement adapter described herein (e.g., the measurement adapter 110 of FIG. 1, the measurement adapter 310 of FIGS. 3A and 3B, the measurement adapter 410 of FIGS. 4A and 4B). The measurement adapter 510 may have the dimensions depicted in FIG. 5.

As depicted in FIG. 5, the sensing device 509 may be installed at the third attachment interface 527. In some examples, threads of the sensing device 509 are mated directly with threads of the third attachment interface 527. When installed in the third attachment interface 527, the sensor 535 of the sensing device 509 may be positioned partially within or adjacent to a side of the channel. In some examples, rather than being directly mated with the third attachment interface 527, the sensing device 509 may be coupled with the third attachment interface 527 via a sensing adapter (e.g., as described herein, such as the sensing adapter 237).

Figure 6:
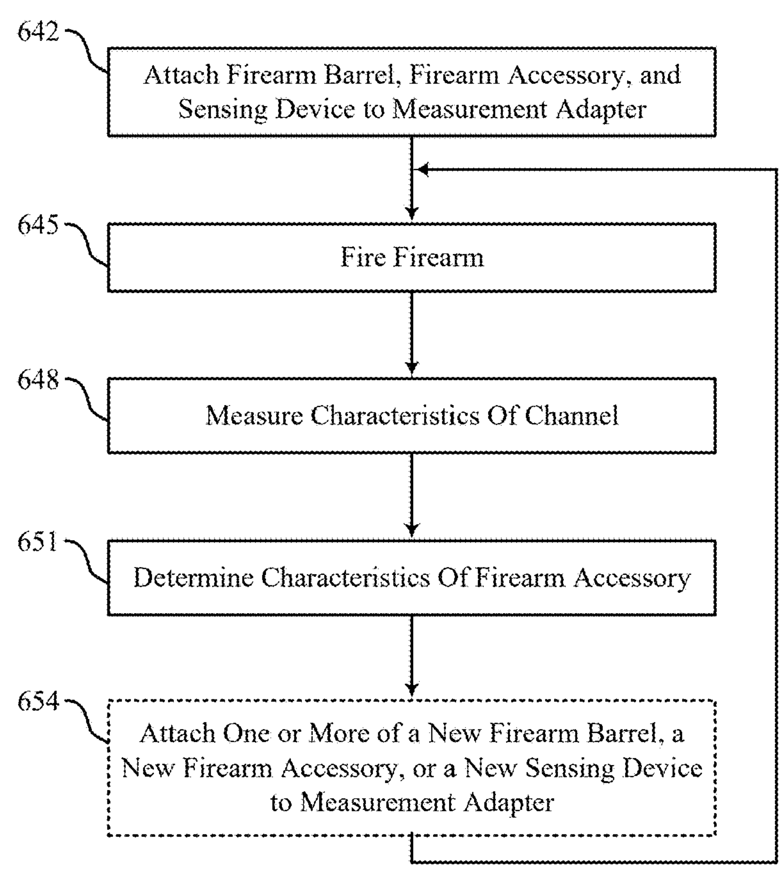
FIG. 6 shows an example of a set of operations for measuring pressure for firearm accessories in accordance with examples as disclosed herein.

FIG. 6 shows an example of a set of operations for measuring pressure for firearm accessories in accordance with examples as disclosed herein.

In some examples, the flowchart 600 shows an example set of operations performed to support measuring pressure for firearm accessories. For example, the flowchart 600 may include operations for attaching a barrel (e.g., as described herein, such as the barrel 107 of FIG. 1) of a firearm (e.g., as described herein, such as the firearm 105 of FIG. 1), a firearm accessory (e.g., as described herein, such as the firearm accessory 115 of FIG. 1), and a sensing device (e.g., as described herein, such as the sensing device 109 of FIG. 1, the sensing device 209 of FIG. 2, or the sensing device 509 of FIG. 5) to a measurement adapter (e.g., as described herein, such as the measurement adapter 110 of FIG. 1, the measurement adapter 210 of FIG. 2, measurement adapter 310 of FIGS. 3A and 3B, the measurement adapter 410 of FIGS. 4A and 4B, or the measurement adapter 510 of FIG. 5) to measure characteristics of the firearm accessory via the measurement adapter.

At 642, a firearm (e.g., via a barrel of the firearm), a firearm accessory, and a sensing device may be attached to a measurement adapter. After attaching the firearm and the firearm accessory, a channel in the measurement adapter may connect a bore of the barrel of the firearm and a bore of the firearm accessory. After attaching the sensing device, a sensor of the sensing device may be oriented relative (e.g., partially within, adjacent to, or externally offset by a particular amount) to the channel such that the sensor is prepared to sense characteristics of the channel.

In some examples, attaching the firearm includes threading the measurement adapter onto the barrel of the firearm. In some examples, attaching the firearm includes plugging a quick connect plug of the measurement adapter into a quick connect coupling of the barrel, or vice versa.

In some examples, attaching the firearm accessory includes threading the firearm accessory (or a component of the firearm accessory, such as a Nielsen device) onto the measurement adapter. In some examples, attaching the firearm accessory includes plugging a quick connect plug of the measurement adapter into a quick connect coupling of the firearm accessory (or component of the firearm accessory), or vice versa.

A diameter of the bore of the barrel may be less than or equal to a diameter of the channel—e.g., as a channel having a smaller diameter than the bore of the barrel may obstruct the trajectory of a projectile fired from the firearm. A diameter of the bore of the firearm accessory may be greater than or equal to a diameter of the channel—e.g., as a firearm accessory bore having a smaller diameter than the channel may obstruct the trajectory of a projectile fired through the channel. In some examples, measurement adapters, firearm barrels, and firearm accessories are threaded such that the firearm bore to channel and channel to firearm accessory bore diameter relationships are prevented from violating the foregoing relationships. For example, a first type of measurement adapter (e.g., having a channel for a 9 mm projectile) and a first type of barrel (e.g., having a bore for a 9 mm projectile) may be threaded so that the measurement adapter may only be coupled with the first type of barrel and cannot be threaded with a second type of barrel (e.g., having a bore for a 10 mm projectile). Similarly, the first type of measurement adapter (e.g., having a channel for a 9 mm projectile) and a first type of firearm accessory (e.g., having a bore for a 9 mm projectile) may be threaded so that the measurement adapter may only be coupled with the first type of firearm accessory and cannot be threaded with a second type of firearm accessory (e.g., having a bore for an 8 mm projectile).

In some examples, attaching the sensing device includes threading the sensing device onto the measurement adapter. In some examples, attaching the sensing device includes plugging a quick connect plug of the measurement adapter into a quick connect coupling of the sensing device, or vice versa. In some examples, attaching the sensing device includes attaching (e.g., threading, plugging, etc.) the sensing device into a sensing adapter and then attaching (e.g., threading, plugging, etc.) the sensing adapter into the measurement adapter.

At 645, the firearm may be triggered to fire a projectile—e.g., after the firearm, firearm accessory, and sensing device are attached to the measurement adapter. The projectile may travel through a bore of the barrel of the firearm and exit into a channel of the measurement adapter. After entering the channel of the measurement adapter, the projectile may continue to travel through the channel of the measurement adapter and exit into a bore of the firearm accessory. After entering the bore of the firearm accessory, the projectile may continue to travel through the bore of the firearm accessory and exit into the environment. Once the projectile is fired from the firearm, the sensor of the sensing device may capture the characteristics of the channel.

At 648, characteristics of the channel may be measured—e.g., before, during, and after the projectile is fired from the firearm. The characteristics of the channel may be measured by observing an output of the sensor and, in some examples, converting the output of the sensor to values. In some cases, the output of the sensor is electronic (e.g., a voltage) and is provided to a processing device (e.g., a computer), which may convert the electronic signal to one or more values—e.g., based on code stored in the computer. The processing device may store and, in some examples, graph the values. In some examples, the output of the sensor is mechanical (e.g., a gauge).

In some examples, a pressure of the channel may be measured before, during, and after the projectile is fired from the firearm. Additionally, or alternatively, a temperature of the channel may be measured before, during, and after the projectile is fired from the firearm. Additionally, or alternatively, a debris in the channel may be measured before, during, and after the projectile is fired from the firearm.

At 651, characteristics of the firearm accessory may be determined based on the characteristics of the channel. In some examples, it may be determined that the characteristics of the firearm accessory before, during, and after the projectile is fired are equivalent to the characteristics measured for the channel before, during, and after the projectile is fired. In some examples, it may be determined that the characteristics of the firearm accessory before, during, and after the projectile is fired are related to (but different than) the characteristics measured for the channel before, during, and after the projectile is fired. In such cases, the characteristics for the firearm accessory may be calculated by applying an offset (e.g., adding an offset, multiplying by a scaling factor, etc.) to the characteristics measured for the channel.

At 654, one or more of a new firearm barrel, a new firearm accessory, or a new sensing device may be attached to the measurement adapter.

In some examples, a firearm barrel manufactured by a different manufacturer (or a firearm barrel for a different model of the same manufacturer) may be attached to the measurement adapter. Additionally, or alternatively, a firearm barrel for a different caliber may be attached to the measurement adapter. In some examples, the different caliber is compatible with (e.g., smaller than) the channel of the measurement adapter and the firearm accessory.

In some examples, a new firearm accessory is attached to the measurement adapter. Additionally, or alternatively, a firearm barrel for a different caliber may be attached to the measurement adapter. In some examples, the different caliber is compatible with (e.g., larger than) the channel of the measurement adapter.

In some examples, a new sensing device that senses a same characteristic (or same characteristics) may be attached to the measurement adapter. In some examples, a new sensing device that senses one or more different characteristics may be attached to the measurement adapter.

After attaching the new firearm barrel, firearm accessory, and/or sensing device, the operations described herein, including with reference to 645 through 651 may be completed to obtain new measurement for the new combination. In some examples, a second firearm accessory may be attached, and the new measurements may be obtained for the second firearm accessory. In some examples, a third firearm accessory may subsequently be attached, and the new measurements may be obtained for the third firearm accessory. The measurement for the different firearm accessories may be plotted on a diagram to compare different behaviors of the different firearm accessories. For example, the pressure experienced by the different firearm accessories may be plotted on a diagram, as described herein including with reference to FIG. 7.

One or more of the operations described in the flowchart 600 may be performed earlier or later, omitted, replaced, supplemented, or combined with another operation. Also, additional operations described herein may replace, supplement or be combined with one or more of the operations described in the flowchart 600.

Figure 7:
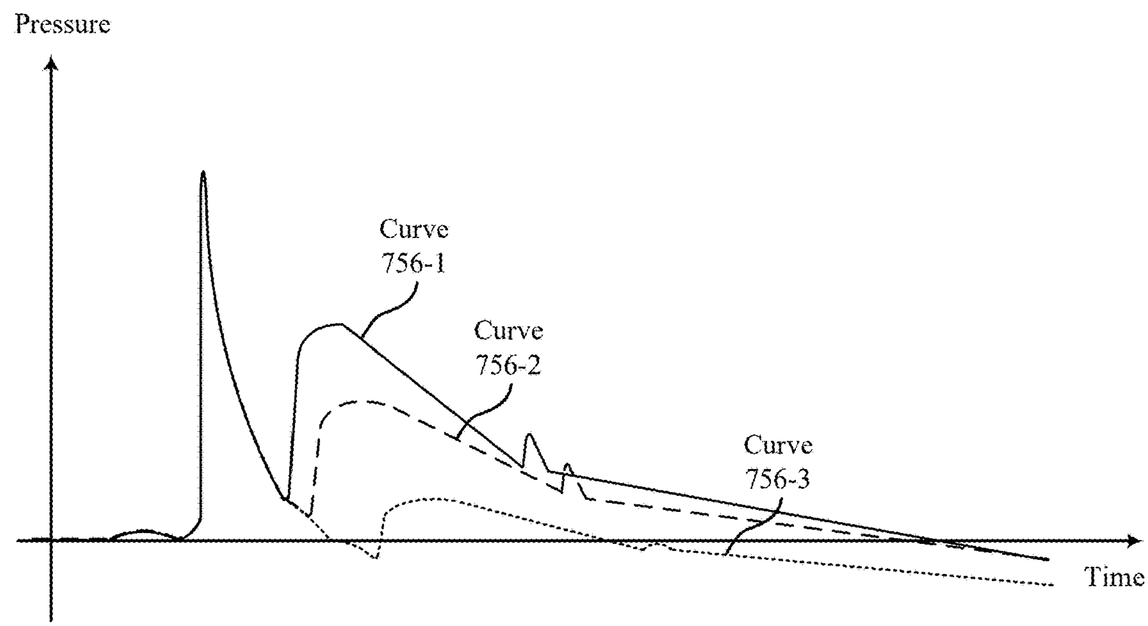
FIG. 7 shows an example of a diagram for measuring pressure for firearm accessories in accordance with examples as disclosed herein.

FIG. 7 shows an example of a diagram for measuring pressure for firearm accessories in accordance with examples as disclosed herein.

The diagram 700 depicts measurements obtained (e.g., using a same sensing device) for a pressure characteristic of three different firearm accessories (e.g., noise suppressors) when a projectile is fired through the three different firearm accessories—e.g., from a same firearm barrel and through a same measurement adapter. The first curve 756-1 depicts a first pressure spike when the projectile passes by the sensor, a second pressure spike (which may be indicative of back pressure) while the projectile travels through the firearm accessory, and a third pressure spike when the projectile exits the firearm accessory. The first curve 756-1 also indicates a duration during which the firearm accessory holds pressure, which may be related to an effectiveness of the noise suppressor (e.g., a noise suppressor that holds pressure longer may be quieter). The second curve 756-2 and the third curve 756-3 similarly depict pressure spikes and a duration during which pressure is held.

The diagram 700 illustrates one of the benefits of the measurement adapter, which is the ability to quickly test and compare the performance of different firearm accessories. In some examples, the different firearm accessories are different variations of a single firearm accessory design, allowing a user or manufacturer to test and compare the effect of small changes to the firearm accessory design at speeds that were not previously possible, which may enable a user or manufacturer to quickly identify those changes that improve the performance of the firearm accessory design.

FIG. 8 shows an example of a diagram for measuring pressure for firearm accessories in accordance with examples as disclosed herein.

At 860, the method 800 may include attaching a barrel of a firearm to a first attachment interface of a measurement adapter, a firearm accessory to a second attachment interface of the measurement adapter, and a sensing device comprising a sensor to a third attachment interface of the measurement adapter that provides the sensor access to a channel formed by the measurement adapter between a bore of the barrel and a bore of the firearm accessory.

At 863, the method 800 may include firing, after the barrel, the firearm accessory, and the sensor are attached to the measurement adapter, a projectile through the firearm, wherein one or more characteristics of the channel are sensed by the sensor based on the projectile being fired through the firearm.

It should be noted that the methods described herein describe possible implementations, and that the operations and the steps may be rearranged or otherwise modified and that other implementations are possible. Further, portions from two or more of the methods may be combined.

A measurement adapter is described. The following provides an overview of aspects of the measurement adapter as described herein.

- Aspect 1: A measurement adapter (e.g., 110), including a body (e.g., 230); a first attachment interface (e.g., 225) coupled with the body and configured to attach the measurement adapter to a barrel (e.g., 107) of a firearm (e.g., 105); and a second attachment interface (e.g., 226) coupled with the body and configured to attach the measurement adapter to a firearm accessory (e.g., 115), where a channel (e.g., 232) extends between the first attachment interface and the second attachment interface through the body and has a substantially uniform diameter along an axial length of the channel between the first attachment interface and the second attachment interface; and a third attachment interface (e.g., 227) coupled with the body and configured to attach the measurement adapter to a sensing device (e.g., 109), wherein the third attachment interface is further configured to provide a sensor (e.g., 235) of the sensing device access to the channel, the sensor being configured to sense characteristics associated with the firearm accessory.
- Aspect 2: The measurement adapter of aspect 1, where the sensing device is attached to the third attachment interface, and where the sensor is positioned partially within or adjacent to the channel based on the sensing device being attached to the third attachment interface.
- Aspect 3: The measurement adapter of aspect 2, where the sensor is configured to measure pressure in the channel, to measure temperature in the channel, or both.
- Aspect 4: The measurement adapter of any of aspects 1 through 3, where the first attachment interface includes a threaded surface that bounds a hole in the first attachment interface, the threaded surface being configured to couple with threads of the barrel, and the second attachment interface includes a threaded shaft configured to couple with threads of the firearm accessory.
- Aspect 5: The measurement adapter of aspect 4, where the threaded surface includes first threads having a thread geometry: ⅝-24 UNEF 3B, and the threaded shaft includes second threads having the thread geometry: ⅝-24 UNEF 3A.
- Aspect 6: The measurement adapter of aspect 4, where a non-threaded hole extends through the threaded shaft of the second attachment interface, and where at least a portion of the channel includes the non-threaded hole.
- Aspect 7: The measurement adapter of any of aspects 1 through 6, wherein the channel is configured to provide a passage from a bore of the barrel to a bore of the firearm accessory when the barrel and the firearm accessory are attached to the measurement adapter.

Aspect 8: The measurement adapter of aspect 7, where a diameter of the channel is greater than or equal to a diameter of the bore of the barrel, and the diameter of the channel is less than or equal to a diameter of the bore of the firearm accessory.

Aspect 9: The measurement adapter of any of aspects 1 through 8, where threads of the third attachment interface are configured to couple with threads of the sensing device including the sensor.

Aspect 10: The measurement adapter of any of aspects 1 through 9, where the third attachment interface is positioned closer to the first attachment interface than the second attachment interface.

Aspect 11: The measurement adapter of any of aspects 1 through 10, further including a sensing adapter (e.g., 237) positioned within the third attachment interface and configured to couple threads of the sensing device (e.g., 109) with non-complementary threads of the third attachment interface, the sensing adapter including a threaded shaft configured to couple with the threads of the third attachment interface and a threaded hole configured to couple with the threads of the sensing device.

Aspect 12: The measurement adapter of aspect 11, where the sensing adapter is configurable to set a distance between a sensing end of the sensor and a side of the channel.

Aspect 13: The measurement adapter of any of aspects 1 through 12, where a hole at a bottom of the third attachment interface extends to a side of the channel.

Aspect 14: The measurement adapter of aspect 13, where the hole at the bottom of the third attachment interface is coupled with an aperture (e.g., 434) in the side of the channel, a diameter of the aperture being based on a diameter of the channel.

Aspect 15: The measurement adapter of aspect 13, where a length of the channel is between 15 mm and 30 mm, a diameter of the channel is between 8 mm and 12 mm, and a diameter of the hole is between 4 mm and 6 mm.

A method is described. The following provides an overview of aspects of the method as described herein.

Aspect 16: A method, including attaching a barrel (e.g., 107) of a firearm (e.g., 105) to a first attachment interface (e.g., 225) of a measurement adapter (e.g., 210), a firearm accessory (e.g., 115) to a second attachment interface (e.g., 226) of the measurement adapter, and a sensing device (e.g., 109) including a sensor (e.g., 235) to a third attachment interface (e.g., 227) of the measurement adapter that provides the sensor access to a channel (e.g., 232) formed by the measurement adapter between a bore (e.g., 108) of the barrel and a bore (e.g., 114) of the firearm accessory, the channel having a substantially uniform diameter along an axial length of the channel between the first attachment interface and the second attachment interface; and firing, after the barrel, the firearm accessory, and the sensor are attached to the measurement adapter, a projectile through the firearm, where one or more characteristics of the channel are sensed by the sensor based on the projectile being fired through the firearm.

Aspect 17: The method of aspect 16, further including measuring, based on the one or more characteristics of the channel being sensed, values for the one or more characteristics of the channel; and determining, based on measuring the values for the one or more characteristics of the channel, values for one or more characteristics of the firearm accessory.

Aspect 18: The method of aspect 17, where the one or more characteristics of the channel includes pressure characteristics, temperature characteristics, or both.

Aspect 19: The method of any of aspects 16 through 18, further including measuring, based on the one or more characteristics of the channel being sensed, a duration of time the firearm accessory holds pressure.

Aspect 20: The method of any of aspects 16 through 19, further including measuring, based on the one or more characteristics of the channel being sensed, a first pressure spike in the firearm accessory, a second pressure spike in the firearm accessory after the first pressure spike in the firearm accessory, or both.

Aspect 21: The method of any of aspects 16 through 20, where attaching the sensing device to the third attachment interface includes screwing the sensing device to the third attachment interface, where threads of the sensing device are complementary to threads of the third attachment interface.

A system is described. The following provides an overview of aspects of the system as described herein.

Aspect 22: A system (e.g., 100), including a firearm (e.g., 105) including a barrel (e.g., 107); a firearm accessory (e.g., 115); a sensing device (e.g., 109); and a measurement adapter (e.g., 110) according to any of aspects 1 through 15.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the term "substantially" means that the modified characteristic (e.g., a verb or adjective modified by the term substantially) need not be absolute but is close enough to achieve the advantages of the characteristic.

As used herein, the terms "optional" or "optionally" mean that the subsequently described event or circumstance may or may not occur, and that the description includes instances where said event or circumstance occurs and instances where it does not.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A measurement adapter, comprising:
a body;
a first attachment interface coupled with the body and configured to attach the measurement adapter to a barrel of a firearm;
a second attachment interface coupled with the body and configured to attach the measurement adapter to a firearm accessory, wherein a channel extends between the first attachment interface and the second attachment interface through the body and has a substantially uniform diameter along an axial length of the channel between the first attachment interface and the second attachment interface; and
a third attachment interface coupled with the body and configured to attach the measurement adapter to a sensing device, wherein the third attachment interface is further configured to provide a sensor of the sensing device access to the channel, the sensor being configured to sense characteristics associated with the firearm accessory.

2. The measurement adapter of claim 1, wherein the sensing device is attached to the third attachment interface, and wherein the sensor is positioned partially within or adjacent to the channel based at least in part on the sensing device being attached to the third attachment interface.

3. The measurement adapter of claim 2, wherein the sensor is configured to measure pressure in the channel, to measure temperature in the channel, or both.

4. The measurement adapter of claim 1, wherein:
the first attachment interface comprises a threaded surface that bounds a hole in the first attachment interface, the threaded surface being configured to couple with threads of the barrel, and
the second attachment interface comprises a threaded shaft configured to couple with threads of the firearm accessory.

5. The measurement adapter of claim 4, wherein a non-threaded hole extends through the threaded shaft of the second attachment interface, and wherein at least a portion of the channel comprises the non-threaded hole.

6. The measurement adapter of claim 1, wherein the channel is configured to provide a passage from a bore of the barrel to a bore of the firearm accessory when the barrel and the firearm accessory are attached to the measurement adapter.

7. The measurement adapter of claim 6, wherein:
a diameter of the channel is greater than or equal to a diameter of the bore of the barrel, and
the diameter of the channel is less than or equal to a diameter of the bore of the firearm accessory.

8. The measurement adapter of claim 1, wherein threads of the third attachment interface are configured to couple with threads of the sensing device comprising the sensor.

9. The measurement adapter of claim 1, wherein the third attachment interface is positioned closer to the first attachment interface than the second attachment interface.

10. The measurement adapter of claim 1, further comprising:
a sensing adapter positioned within the third attachment interface and configured to couple threads of the sensing device with non-complementary threads of the third attachment interface, the sensing adapter comprising a threaded shaft configured to couple with the threads of the third attachment interface and a threaded hole configured to couple with the threads of the sensing device.

11. The measurement adapter of claim 10, wherein the sensing adapter is configurable to set a distance between a sensing end of the sensor and a side of the channel.

12. The measurement adapter of claim 1, wherein a hole at a bottom of the third attachment interface extends to a side of the channel.

13. The measurement adapter of claim 12, wherein the hole at the bottom of the third attachment interface is coupled with an aperture in the side of the channel, a diameter of the aperture being based at least in part on a diameter of the channel.

14. A method, comprising:
attaching a barrel of a firearm to a first attachment interface of a measurement adapter, a firearm accessory to a second attachment interface of the measurement adapter, and a sensing device comprising a sensor to a third attachment interface of the measurement adapter that provides the sensor access to a channel formed by the measurement adapter between a bore of the barrel and a bore of the firearm accessory, the channel having a substantially uniform diameter along an axial length of the channel between the first attachment interface and the second attachment interface; and
firing, after the barrel, the firearm accessory, and the sensor are attached to the measurement adapter, a projectile through the firearm, wherein one or more characteristics of the channel are sensed by the sensor based at least in part on the projectile being fired through the firearm.

15. The method of claim 14, further comprising:

measuring, based at least in part on the one or more characteristics of the channel being sensed, values for the one or more characteristics of the channel; and determining, based at least in part on measuring the values for the one or more characteristics of the channel, values for one or more characteristics of the firearm accessory.

16. The method of claim 15, wherein the one or more characteristics of the channel comprises pressure characteristics, temperature characteristics, or both.

17. The method of claim 14, further comprising:

measuring, based at least in part on the one or more characteristics of the channel being sensed, a duration of time the firearm accessory holds pressure.

18. The method of claim 14, further comprising:

measuring, based at least in part on the one or more characteristics of the channel being sensed, a first pressure spike in the firearm accessory, a second pressure spike in the firearm accessory after the first pressure spike in the firearm accessory, or both.

19. The method of claim 14, wherein attaching the sensing device to the third attachment interface comprises screwing the sensing device into the third attachment interface, wherein threads of the sensing device are complementary to threads of the third attachment interface.

20. A system, comprising:

a firearm comprising a barrel;

a firearm accessory;

a sensing device; and a measurement adapter, comprising:

a body, a first attachment interface coupled with the body and configured to attach the measurement adapter to the barrel of the firearm, a second attachment interface coupled with the body and configured to attach the measurement adapter to the firearm accessory, wherein a channel extends between the first attachment interface and the second attachment interface through the body, the channel being configured to provide a passage from a bore of the barrel to a bore of the firearm accessory, wherein the channel has a substantially uniform diameter along an axial length of the channel between the first attachment interface and the second attachment interface, and a third attachment interface coupled with the body and configured to attach the measurement adapter to the sensing device, wherein the third attachment interface is configured to provide a sensor of the sensing device access to the channel.

* * * * *